United States Patent [19]
Hansen

[11] Patent Number: 5,865,592
[45] Date of Patent: Feb. 2, 1999

[54] STONE METERING SYSTEM FOR RAILROAD TRACK MAINTENANCE VEHICLE

[75] Inventor: Kevin A. Hansen, Ludington, Mich.

[73] Assignee: Pandrol Jackson, Inc., Ludington, Mich.

[21] Appl. No.: 468,266

[22] Filed: Jun. 6, 1995

Related U.S. Application Data

[62] Division of Ser. No. 249,742, May 26, 1994.

[51] Int. Cl.$^6$ ..................................................... E01B 27/10
[52] U.S. Cl. ......................... 414/502; 198/661; 198/360; 414/296; 414/501; 414/293; 104/2
[58] Field of Search ................................... 414/326, 325, 414/295, 296, 294, 526, 528, 501, 502, 518, 293; 198/661, 662, 676, 657, 467.1; 104/5, 6, 2, 1 R; 222/412, 413; 171/16; 37/104; 239/675, 659

[56] References Cited

U.S. PATENT DOCUMENTS

| | | | |
|---|---|---|---|
| 2,908,406 | 10/1959 | Arlin | 414/294 |
| 2,931,521 | 4/1960 | Hartley | 414/294 |
| 3,319,768 | 5/1967 | Holzhauer et al. | 198/360 X |
| 4,450,771 | 5/1984 | Theurer et al. | 414/501 X |
| 4,479,439 | 10/1984 | Theurer et al. | 104/2 X |
| 4,617,177 | 10/1986 | Schumacher | 198/662 X |
| 4,795,264 | 1/1989 | Riker | 414/256 X |
| 5,101,733 | 4/1992 | Mohr | 104/2 X |

FOREIGN PATENT DOCUMENTS

| | | | |
|---|---|---|---|
| 1049306 | 1/1959 | Germany | 414/293 |
| 426712 | 11/1947 | Italy | 198/661 |
| 151507 | 9/1982 | Japan | 414/293 |
| 192622 | 8/1986 | Japan | 414/296 |
| 85403 | 3/1990 | Japan | 104/2 |
| 786199 | 11/1957 | United Kingdom | 414/296 |

*Primary Examiner*—Frank E. Werner
*Attorney, Agent, or Firm*—Warner Norcross & Judd

[57] ABSTRACT

A stone metering system for a railroad track maintenance vehicle providing improved accuracy in stone delivery. The system includes a surge hopper, a number of metering augers, and a corresponding number of splitters. The metering augers convey ballast stones from the surge hopper to the corresponding splitters, which divide the stones evenly between a number of blow tubes. The pitch of the auger screw flights is increased from the inlet end of the screw to "expand" the stone and reduce the production of fines. In addition, the diameter of the final screw flight is reduced at the outlet end of the auger to provide a consistent and even flow of stone into the splitters. The splitters are dynamically adjustable to provide even distribution between the blow tubes regardless of the cant to the rails. The desired amount of stone is delivered to the tubes by rotating the auger screw the number of full or partial revolutions associated with the amount. In an alternative embodiment, each of the metering augers is replaced by a conveyor having a belt divided into a series of uniformly sized compartments each conveying the same quantity of stone. The desired amount of stone is delivered to the tubes by driving the belt so that a desired number of compartments are emptied into the splitter.

8 Claims, 7 Drawing Sheets

STONE METERING SYSTEM FOR RAILROAD TRACK MAINTENANCE VEHICLE

This is a divisional of application Ser. No. 08/249,742, filed May 26, 1994.

BACKGROUND OF THE INVENTION

The present invention relates to a stone or ballast metering system for a railroad track maintenance vehicle.

The tremendous forces exerted on railroad track as trains and other rail vehicles move over the track results in displacement of the rails and ties within the stones or "ballast." In particular, the vertical position of the ties within the track ballast changes, usually with the ties settling deeper into the ballast, changing the height of the track. Accordingly, periodic realignment of the railroad track within the bed is necessary to restore the track to its desired configuration. Realignment is performed by either a tamper or a stone blower.

A tamper includes a jacking mechanism which grasps and lifts the rails and ties attached thereto. The tamper also includes blades which penetrate the ballast and are vibrated to force the ballast back under the lifted ties to return the track to a desired vertical position.

A stone blower also includes a jacking mechanism which grasps and lifts the rails and ties. However, rather than blades, the stoneblower includes tubes which penetrate the ballast and force new or additional stones beneath the ties. More particularly, a stoneblower is a vehicle that travels upon the track rails and carries a track lifting device, a number of workheads, a source of compressed air, a supply of ballast stones, and a stone metering system. The workheads each include one or more blow tubes through which ballast stone is blown by compressed air. In operation, the track lifting device raises the track rails and the ties to which the rails are secured, which creates a void beneath the ties. The blow tubes are forced into the track bed adjacent the raised ties to direct a measured quantity of ballast stone under the ties. The amount of stone is determined by the desired amount of lift.

The amount of ballast stone blown beneath each tie is crucial to the proper level of the tracks. The ballast stone must be delivered to the workheads in the proper quantity. It is the function of the stone metering system to ensure that the proper quantity of stone is delivered from the supply of ballast stones to the workheads.

In the past, vibratory chute style stone metering systems have been employed. This type of system utilizes a feeder pan to receive the desired amount of stone by weight. The measured stone is passed in bulk to a vibratory chute type feeder. The vibratory chute feeds the measured stone to the blow tubes at a fairly constant rate. This type of stone metering system is difficult to incorporate into the configuration and profile of the stoneblower. In addition, the precision of this design is adversely affected by a variety of elements, such as track cant, stone moisture content, track grade, and cycle time.

Another known type of stone metering system includes a number of auger conveyors which convey and meter stone to the workheads. Each auger conveyor includes an auger screw housed within a casing. As the auger screw is rotated, stone is conveyed along the flights of the screw. The amount of stone supplied to the blow tubes is measured by calculating the flow rate of the auger conveyor and monitoring the revolutions of the auger screw. Auger systems include an auger conveyor for each blow tube. Auger type stone metering systems have a variety of shortcomings. First, degradation (i.e. pulverization) of the stone during the conveying process produces "fines" (i.e. powdered stone) which reduces the accuracy of the metering system. Second, pulsed output of stone from the metering auger can lead to uneven distribution of stone. Third, the required multiplicity of augers is relatively expensive, bulky, and difficult to incorporate into the profile of a stoneblower.

SUMMARY OF THE INVENTION

The aforementioned problems are overcome by the present invention wherein an auger-type stone metering system includes augers that each feed multiple blow tubes. More particularly, the stone metering system includes a number of metering augers and a splitter for each auger. The metering augers convey the ballast stones upward along the flights of a rotating auger screw housed within a cylindrical casing. At the upper end, the stone is expelled onto the corresponding splitter. Each splitter includes two adjacent feed compartments which divide the stone supplied by the metering auger between two adjacent blow tubes. The splitters are moveable to provide the desired distribution between the blow tubes even when the stoneblower is tilted due to significant cant to the rails.

In a second aspect of the invention, the screw within the auger has a unique configuration to expel stone at a more uniform rate than previously has been possible. The pitch of the auger screw flights is increased between the inlet end and the outlet end to "expand" the stone reducing the production of fines through grinding and shearing. In addition, the diameter of the auger screw is tapered down or reduced toward the outlet end of the auger to improve consistent and even flow of stone onto the splitters.

A second embodiment of the invention incorporates a different metering conveyor. Specifically, each metering conveyor is a belt having a series of uniform, adjacent compartments along its length—somewhat like an ice-cube tray. Each compartment holds a known quantity of stone. Therefore, the stone can be metered by operating the conveyor to dump a desired number of compartment of stone onto the associated splitter. Preferably, a distribution plate is positioned over each conveyor to ensure that each compartment is evenly filled.

The present invention provides an accurate and reliable stone metering system for use in track maintenance vehicles. The variable-pitch and variable-diameter auger screw reduces pulverization of stone during the conveying process and makes the flow of stone out of the auger more consistent. In addition, the adjustable splitters compensate for a wide variety of flow factors, such as track cant, material characteristics, stone moisture content, track grade, and cycle time. Further, the splitters enable the number of metering augers to be cut in half thereby reducing the cost and profile of the system.

These and other objects, advantages, and features of the invention will be more fully understood and appreciated by reference to the detailed description of the preferred embodiment and the drawings.

DETAILED DESCRIPTION OF THE PREFERRED EMBODIMENT

The stone metering system of the present invention is illustrated in the drawings and generally designated 10. By way of example, and not by way of limitation, the stone metering system will be described in connection with a stoneblower 12. The stoneblower 12 (FIGS. 1a–c) includes a superstructure 14 carrying a supply of ballast stones 18, a plurality of workheads 22a–d, a stone replenishing system 70, and a stone metering system 10. Each workhead 22a–d includes a pair of blowing tubes 30a–b. The stoneblower 12 also includes wheels 13 for supporting the superstructure 14 upon the rails and an engine 15 for moving the stoneblower 12 along the track.

Figure 1A:
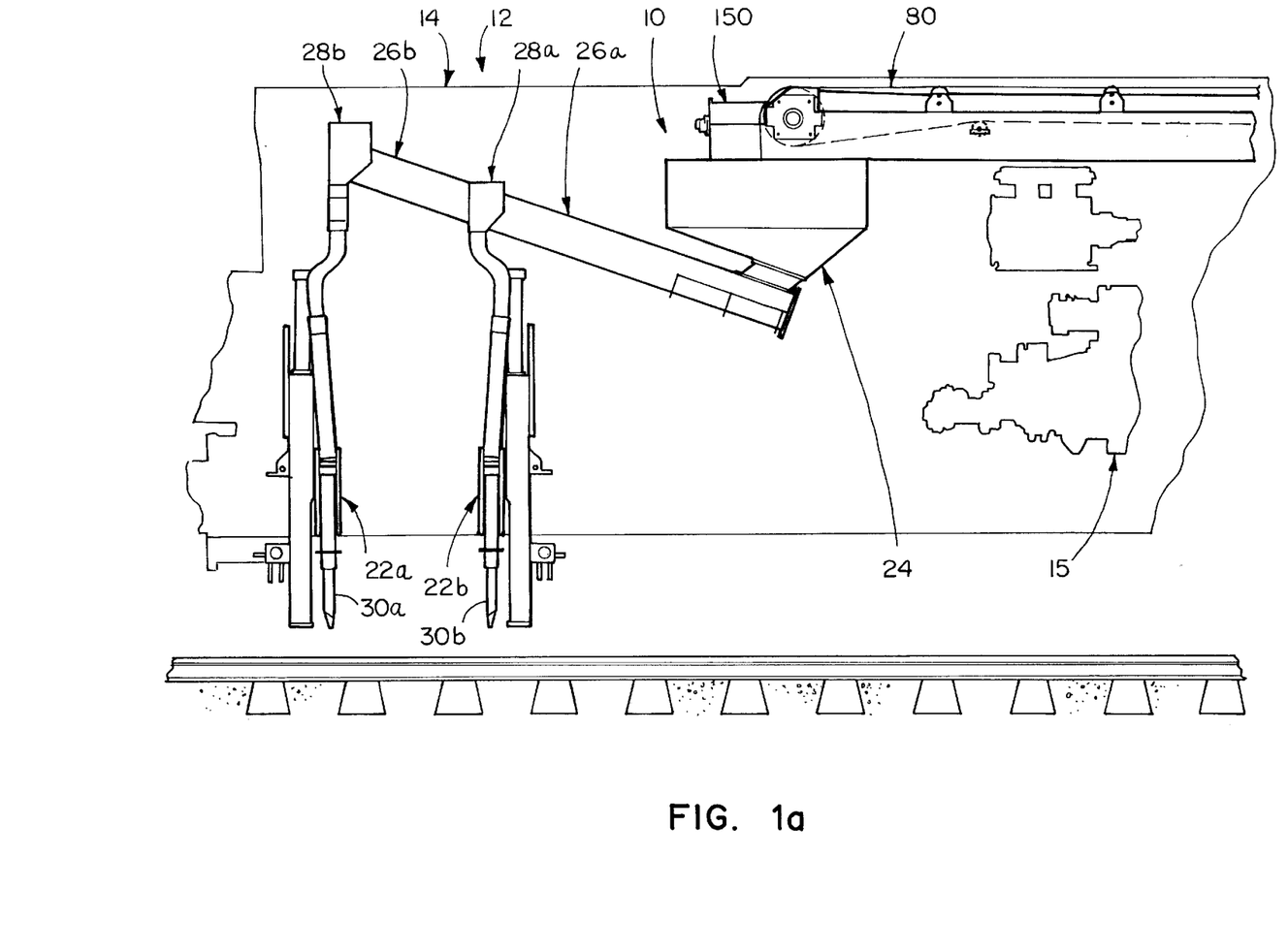
FIG. 1a is a fragmentary side elevational view of a portion of a stoneblower showing the surge hopper, the work head, and the stone conveying/metering system of the present invention.
Figure 1B:
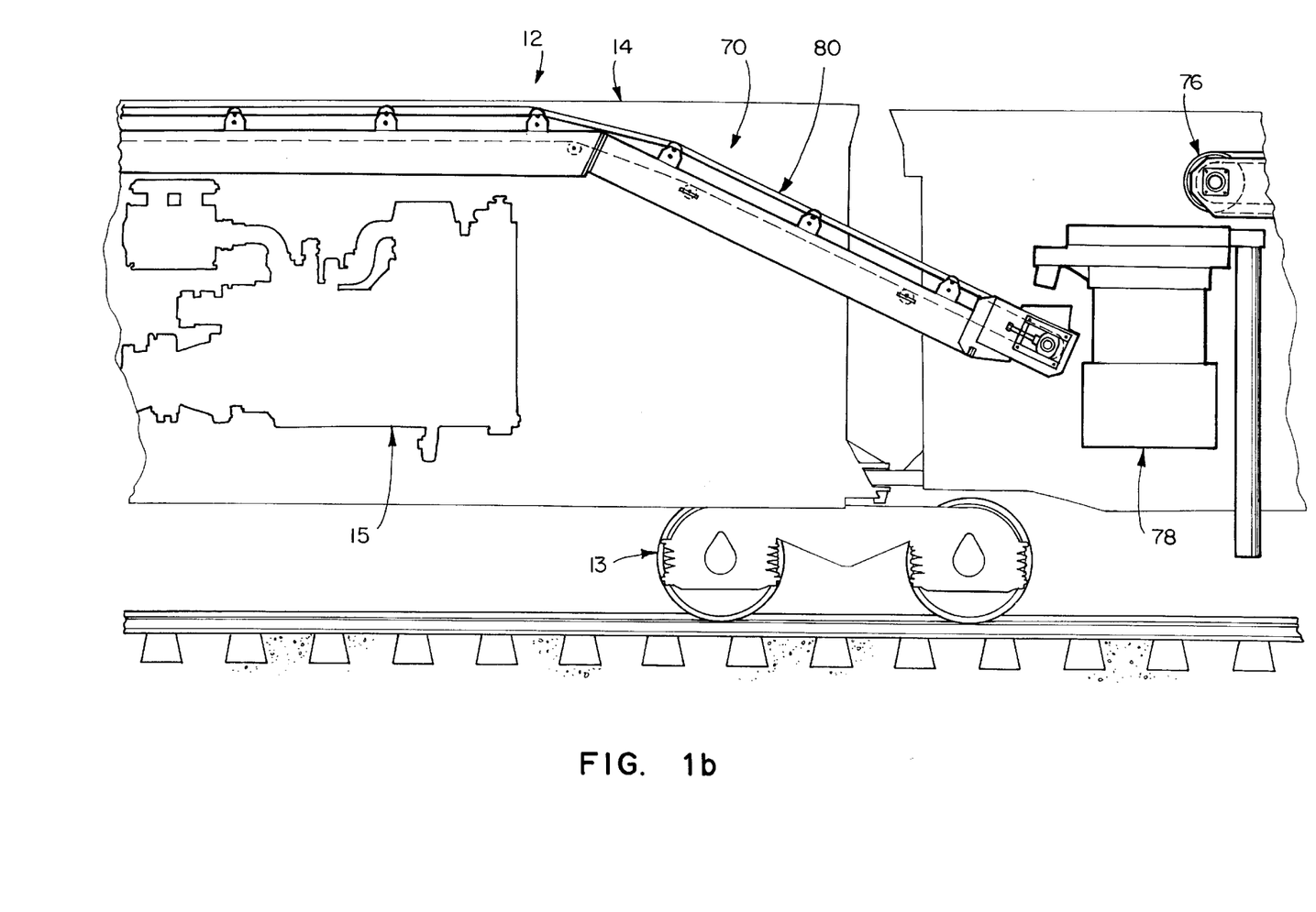
FIG. 1b is a fragmentary side elevational view of a second portion of the stoneblower to the right of FIG. 1a showing a portion of the conveyor system for moving stone from the main hopper to the surge hopper.
Figure 1C:
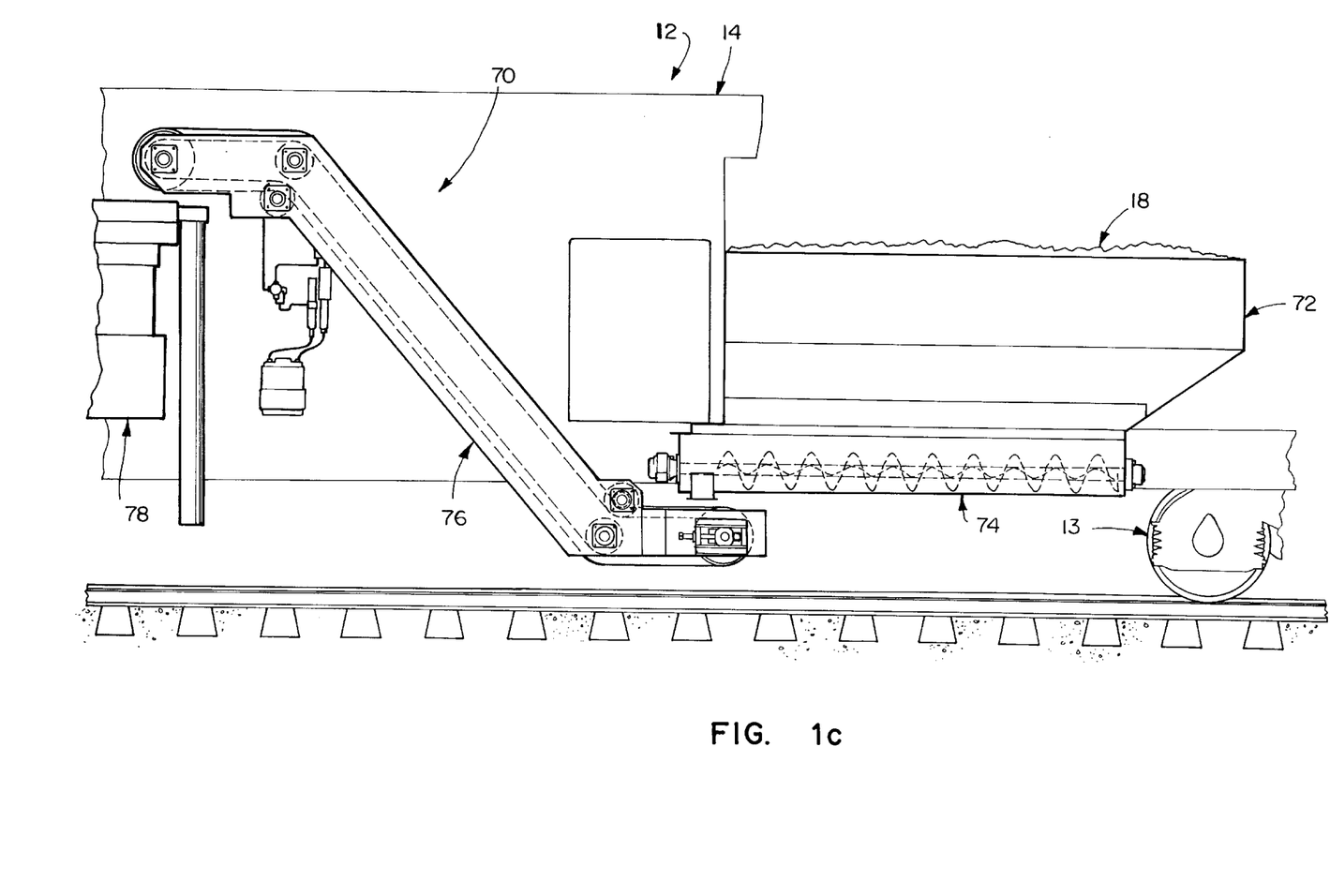
FIG. 1c is a fragmentary side elevational view of a third portion of the stoneblower to the right of FIG. 1c showing the main hopper and a portion of the conveyor system for moving stone from the main hopper to the surge hopper.

The stoneblower 12 travels along track to be realigned. A conventional track lifting device (not shown) carried on the superstructure 14 raises both the track rails and the ties to which the rails are secured, thereby creating a void beneath the raised ties. The workhead 22a–d forces the pair of blowing tubes 30a–b into the track bed adjacent to and straddling the raised track ties. Stone is then blown through the blowing tubes 30a–b into the voids beneath the raised ties. The stone is propelled through the blowing tubes 30a–b by compressed air that is supplied by any conventional means, such as an air compressor. Upon completion, the workhead 22a–d withdraws the blowing tubes 30a–b; and the stoneblower 12 indexes to the next tie.

I. Stone Replenishing System

A stone replenishing system 70 is provided to move stone from the main hopper 18 to the stone metering system 10 when the level of stone in the surge hopper 24 becomes low. While the surge hopper 24 will be described in greater detail below in conjunction with the stone metering system 10, a basic knowledge of its general structure and function are necessary for a clear understanding of the stone replenishing system 70. In general, the surge hopper 24 is an intermediate storage compartment that receives stone from the main hopper 72 and feeds that stone to the stone metering system 10. The surge hopper 24 has a wide but rather shallow construction which allows it to fit within the profile of the maintenance vehicle (See FIGS. 2–4). As a result of the relatively shallow nature of the surge hopper 24, the supply of stone carried therein must be periodically replenished by the stone replenishing system 70.

Figure 3:
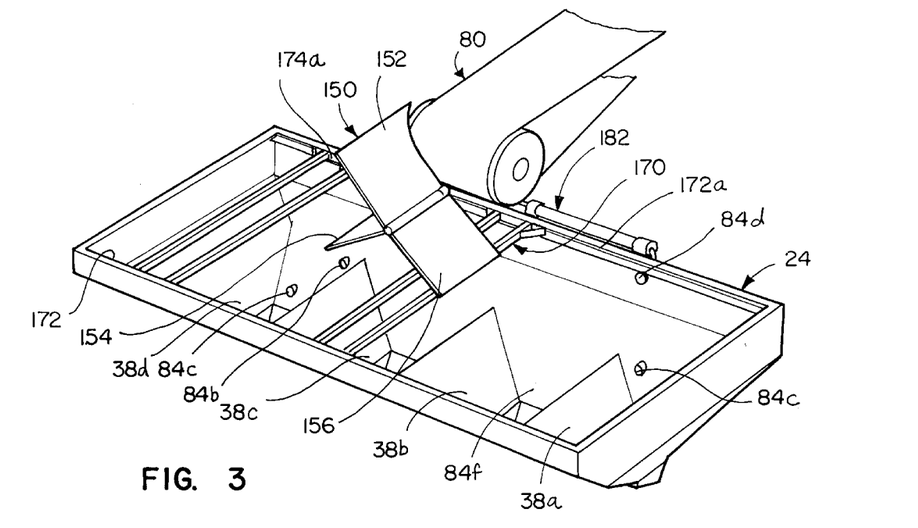
FIG. 3 is a perspective view of the surge hopper.
Figure 4:
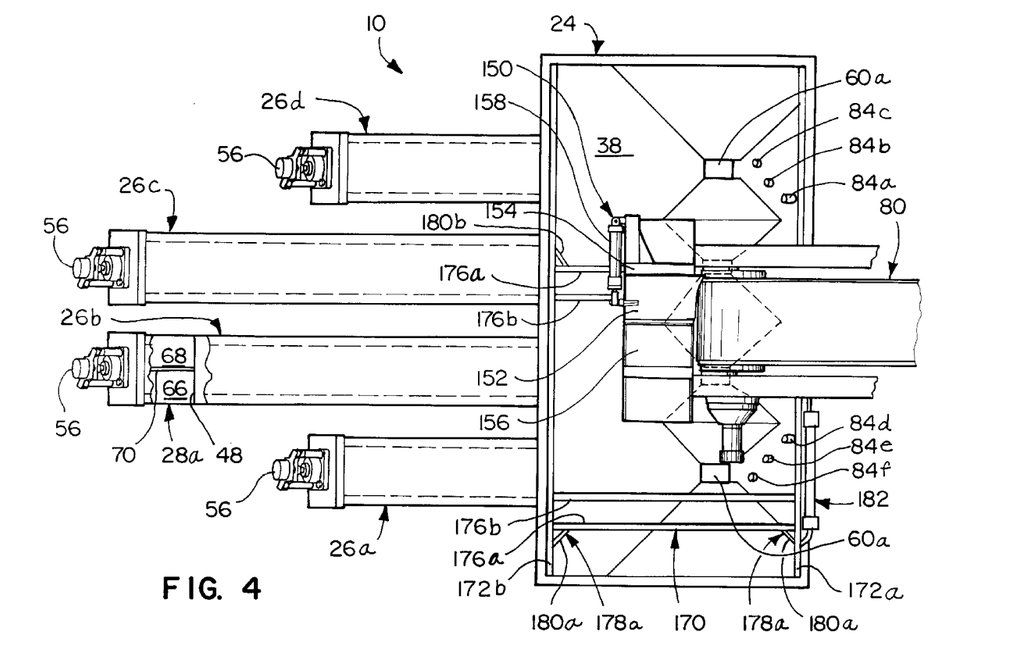
FIG. 4 is a top plan view of the surge hopper and stone augers.

Referring again to FIGS. 1a–c, the stone replenishing system 70 generally includes a main hopper 72, a main auger 74, a cleat conveyor 76, a stone scalper 78, a horizontal conveyor 80, a diverter assembly 150, and a plurality of stone level sensors 84a–f (See FIGS. 3 and 4). The main hopper 72 is supported upon the superstructure and carries the supply of ballast stones 18. The stone replenishing system 70 is controlled by the control system of the maintenance vehicle which monitors the stone level sensors 84a–d to periodically activate the system 70.

The stone level sensors 84a–f are mounted within the surge hopper 24 to monitor the level of stone therein (See FIGS. 3 and 4). Because of the wide and shallow construction of the surge hopper 24, stone level may vary at opposite sides of surge hopper 24. Accordingly, the stone level sensors 84a–f are aligned in two rows located on opposite sides of the surge hopper 24. Each row of sensors includes a high 84a and 84d, low 84b and 84e, and empty 84c sensor. In a preferred embodiment, the stone level sensors 84a–f are photoelectric sensors. However, a variety of other types of sensors may be employed and the incorporation thereof will be apparent to those of ordinary skill in the art.

Just as it is important to independently monitor the level of stone at opposite sides of the hopper 24, it is also important to independently feed stone to opposite sides of the hopper 24. As perhaps best illustrated in FIGS. 3 and 4, the diverter assembly 150 is mounted adjacent the end of the horizontal conveyor 80 to control the proportional flow of stone to opposite sides of the surge hopper 24. In a preferred embodiment, the diverter assembly 150 is mounted above the surge hopper 24 in alignment with the horizontal conveyor 80 and includes three diverter plates 152, 154 and 156 that extend radially from a common axis. Plates 154 and 156 are inclined to direct stone to opposite sides of the surge hopper 24. Plate 152 extends upward from and is pivotally secured to plates 154 and 156 at a common axis. Plate 152 divides and directs the stone flowing from the horizontal conveyor 80 toward plates 154 and 156. Changing the angular position of plate 152 alters the proportional flow of stone to plates 154 and 156, and consequently to opposite sides of the surge hopper 24. A double acting air cylinder 158 driven by the control system in response to data received from the stone level sensors 84a–f may be secured to plate 152 to provide automated control over its angular position. If the sensors 84a–f indicate that one side of the surge hopper 24 is lower than the other, then diverter plate 152 is positioned to increase the proportional flow of stone to the lower side.

II. Stone Metering System

Figure 2:
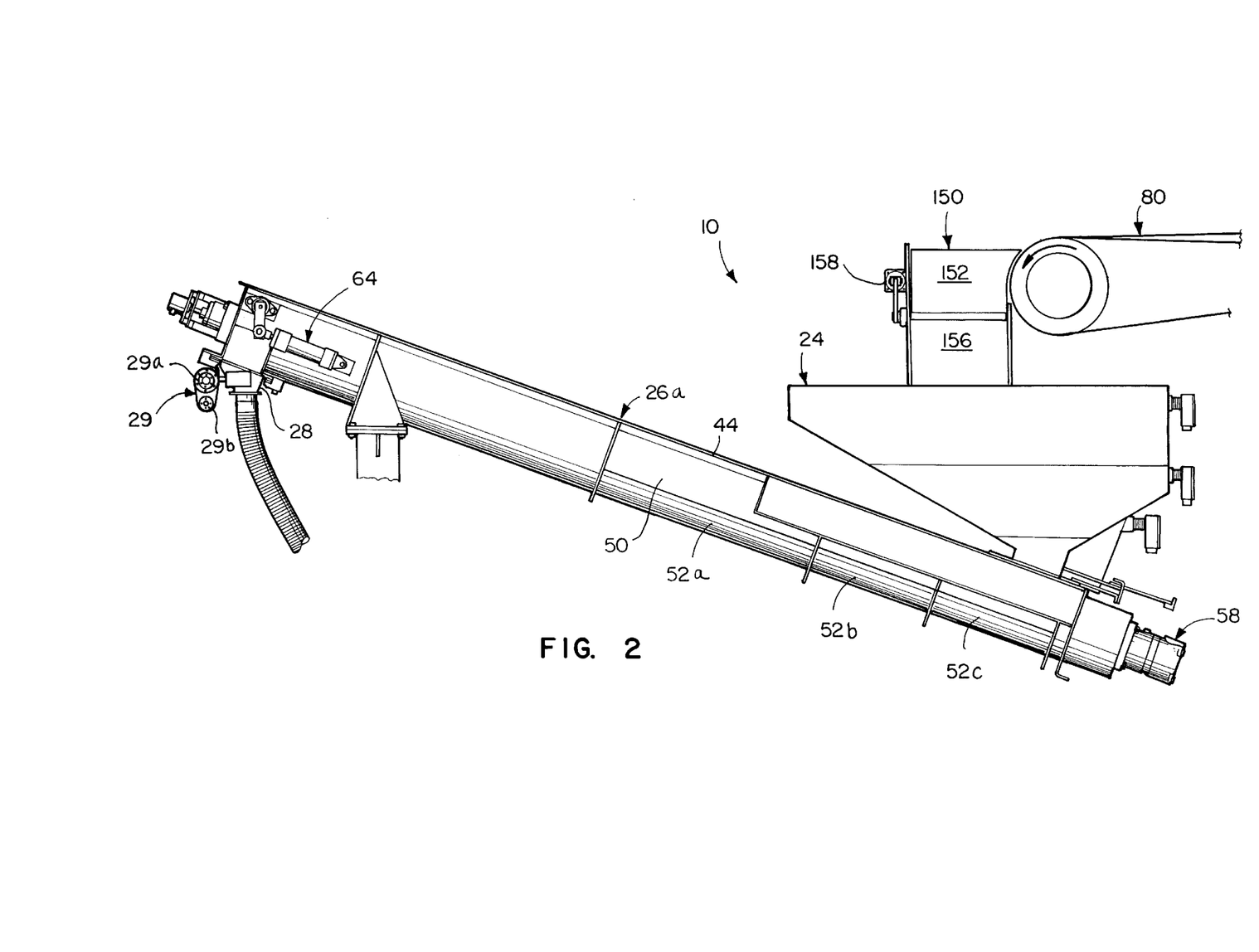
FIG. 2 is a side elevational view of the surge hopper and one stone auger.

The stone metering system 10 meters and conveys metered quantities of ballast stone to the workheads 22a–d. Referring to FIGS. 1 and 2, the stone metering system 10 is mounted upon the stoneblower 12 and includes a surge hopper 24, a plurality of metering augers 26a–d, and a plurality of splitters 28a–d.

As discussed above, the surge hopper 24 is fed by the stone replenishing system 70 and provides a constant supply of stone to the stone metering system 10. As perhaps best illustrated in FIG. 4, the surge hopper 24 has an open top and includes four feed compartments 38a–d. Each compartment 38a–d is tapered to feed one of the metering augers 26a–d through openings 60a–d in the bottom of each compartment 38a–d.

To provide even distribution of stone throughout compartments 38a–d, a rack 170 is mounted for reciprocating motion atop the surge hopper 24 (See FIG. 3). The rack 170 is slidably received within a pair of C-shaped guideways 172a–b. The rack 170 is secured to a reciprocating rack cylinder 182 and is synchronized to start and stop in correspondence with the stone replenishing system 70. In a preferred embodiment, the rack 170 includes two longitudinally extending beams 174a–b that are received within guideways 172a–b. Two pairs of cross tubes 176a–b extend between opposite longitudinal end portions of beams 174a–b. When the stone piled in the surge hopper 24 extends above the plane defined by the rack 170, the reciprocating cross tubes 176a–b engage and distribute the stone throughout the hopper 24.

In addition, opposite longitudinal ends of each beam 174a–b include conventional wear pads (not shown) and a sweep 178a–d. The wear pads are removably secured to each beam 174a–b to engage the guideways 172a–b and prevent premature wear of the beams 174a–b and guideways 172a–b. The wear pads may be replaced as necessary to extend the life of the rack assembly. The sweeps 178a–d are comprised of a plate 180a–d that extends angularly into the guideways 172a–b from the end of each beam 174a–b. The reciprocating motion of the rack 170 causes the plates 180a–d to "sweep" out any stone that may have accumulated within the guideways 172a–b.

One metering auger 26a–d is positioned below each of the surge hopper compartments 38a–d. As perhaps best illustrated in FIG. 5, each metering auger 26a–d generally includes a casing 44 and an auger screw 40 with variable pitch and variable diameter flights 42. The casing of the metering auger 44 includes a "U" shaped trough 50 that cooperates with a plurality of cover sections 52a–c to define a cylindrical chamber within which the auger screw 40 is rotatably supported (See FIG. 2). The cover sections 52a–c are removable to allow inspection, servicing, and cleaning of the auger 26a–d. In the preferred embodiment, the internal diameter of the casing 44 is approximately 9.00 inches (228.6 mm), and, as discussed below in more detail, the external diameter of the auger screw flights 42 is approximately 6.0 inches (15.24 cm). This provides a 1.5 inch (38.1 mm) screw-to-casing clearance which allows significant stone movement with reduced torque requirements and lower potential for jamming.

Figure 5:
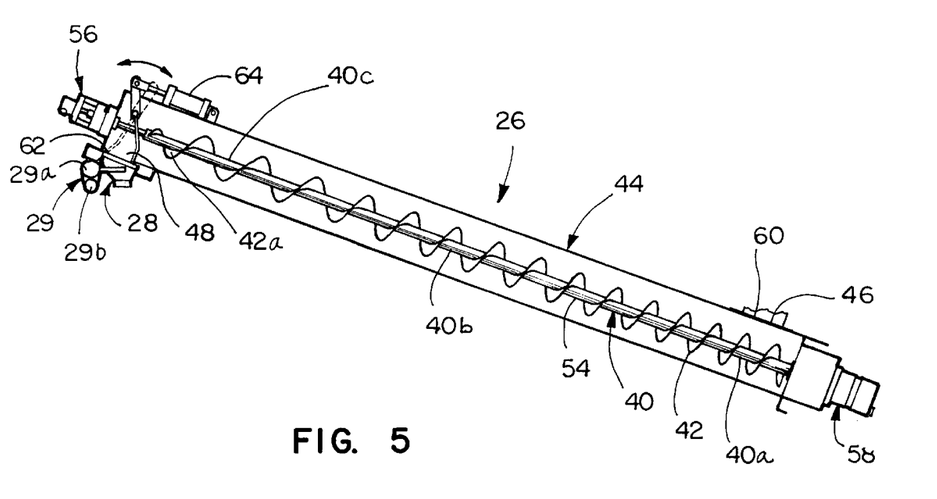
FIG. 5 is a sectional view of a stone metering auger showing the screw.

Inlet and outlet openings 46 and 48 extend through the side walls of the casing 44 adjacent longitudinally opposite ends of the metering augers 26a–d. The inlet opening 46 is located in the upper surface of the casing 44 where it may be aligned with one of the openings 60a–d in the surge hopper 24 to allow stone to feed into the casing 44 by gravity. The outlet opening 48 is disposed in the lower surface of casing 44 so that stone will flow from the metering auger. In a preferred embodiment, the auger screw 40 is supported within the casing 44 at the outlet end by an end plate bearing (not shown) and at the inlet end by a drive motor bearing (not shown).

The auger screw 40 (see FIG. 5) is constructed of sectional flights 42 welded to center shaft 54. In the preferred embodiment, the center shaft is two-inch schedule 80 pipe and the screw flights 42 have a maximum diameter of 6.0 inches (15.24 cm). In order to reduce wear, the screw flights 42 are preferably constructed of an abrasion resistant steel. The pitch of the auger screw flights 42 is approximately ⅔ at the inlet end 40a of the screw near the inlet end of the casing 44. The pitch is 1 or full along the remaining portion 40b of the screw 40. The increase in pitch expands the stone during the conveying process to decrease the production of fines by reducing cross abrasion between the stones. In the presently preferred embodiment, the pitch of the inlet end 40a is 4.0 inches; and the pitch of the remaining portion 40b is 6.0 inches.

In addition, the last flight 42a adjacent the outlet end 40c of the screw tapers from the full diameter to the diameter of the center shaft 54. The stone naturally rides in the "bottom" of each flight as it travels up the screw. Without the described tapering, the stone would be discharged in these bunches as each screw flight emptied. By reducing the screw diameter at the discharge end, the stone becomes a more continuous or uniform flow. This enables the stone to flow from the metering augers 26a–d in a smooth manner.

An encoder 56 is mounted to the outlet end of the casing 44 to allow the control system to monitor the revolutions or rotational movement of the auger screw 40. The preferred dimensions of the auger screw 40 and casing 44 described above yield an average stone flow rate of 1.32 kilograms per revolution. Based on the average flow rate and rotational movement of the auger screw 40, the control system determines the amount of stone supplied to the blow tubes and adjusts the speed of the drive motor 58 accordingly. A variety of encoders capable of converting rotational movement into electrical signals are well known to those of ordinary skill in the art.

A drive motor 58 is mounted to the inlet end of the casing 44 for engaging and rotatably driving the auger screw 40. In the preferred embodiment, each blowing tube requires anywhere from 0.25 to 1.0 kg/second of stone. Because each metering auger 26 supplies stone to two blowing tubes, each auger 26 must have a delivery range of 0.5–2.0 kg/sec, or twice the single tube stone requirements. Based on the above-noted average flow rate of 1.32 kg/revolution, the auger screw 40 must have a speed range of approximately 23 to 91 rotations per minute to meet the stone delivery requirements. The hydraulic motor 58 is controlled by a standard double-solenoid-operated three-position valve allowing reversal of the screw when required to clean or unjam the auger. As is well known to those skilled in the art, pressure-compensated flow controls may be used to maintain smooth rotation of the auger screw 40 under varied torque requirements.

The profile constraints of the maintenance vehicle require that the openings 60a–d in the surge hopper 24 lie horizontally below the splitters 28a–d. Accordingly, the metering augers 26a–d are inclined upward from the inlet end of the casing to lift the stone to the splitters 28a–d. In a preferred embodiment, the metering augers 26a–d are inclined upward approximately 20 degrees to accommodate the size of the surge hopper 24 and the profile of the maintenance vehicle. The inclination of the auger can be decreased to reduce the development of fines and also to reduce the torque requirements on the drive motor. However, in order to do so, the height of the workheads 22a–d or the depth of the surge hopper 24 must be sacrificed.

The splitters 28a–d include an open top and two adjacent compartments 66 and 68 each separated from the other by a splitter wall 70 generally aligned with the outlet 48 of the corresponding metering auger 26a–d. On level track, the splitter 28a–d is preferably offset from the center of the outlet 48 by 0.19 inches. The offset compensates for the stone being propelled slightly off center by the auger screw 40. On railroad track with significant cant, the offset of the splitter 28a–d may be adjusted to compensate for the angle of the vehicle and provide for accurate distribution of the stone between the two blow tubes. For example, the stone is accurately split with an offset of 0.62 inches for track cant of 4 degrees and an offset of 1.06 inches for track cant of 8 degrees. The offset of the common wall 70 is controlled by an automated linear actuator 29 incorporated into the control system (See FIGS. 2–3). In the preferred embodiment, the automated actuator 29 also includes a position feedback mechanism 29b, such as a potentiometer, to measure the offset of the common wall 70. In operation, the position feedback mechanism 29b measures the offset of the common wall 70. Based on this measurement, the actuator 29 is either extended or retracted to obtain the desired offset for the existing cant.

III. Operation of Auger Embodiment

In operation, the control system (not shown) continually monitors the stone level sensors 84a–f to determine when the supply of stone in the surge hopper 24 requires replenishing. When the stone level sensors 84a–b indicate that the level of stone on either side of the surge hopper 24 is low, the stone replenishing system 70 is activated. The control system starts the main auger 74, the cleat conveyor 76, the stone scalper 78 and the horizontal conveyor 80. The main auger 74 moves stone out of the main hopper 72 to the cleat conveyor 76. The cleat conveyor 76 carries stone from the main hopper 72 to the stone scalper 78.

The stone scalper 78 is of conventional design and filters the stone by a screen that prevents any stones larger than the openings of the screen from passing through to the horizontal conveyor 80.

The horizontal conveyor 80 receives the scalped stone and delivers it to the surge hopper 24. As the stone is expelled from the horizontal conveyor 80, the diverter assembly 150 directs it in proper proportion to opposite sides of the surge hopper 24 as described above. The stone replenishing system does not stop delivering stone to the surge hopper 24 until both high sensors 84a and 84d are activated. In addition, if either empty sensor 84c or 84f is activated then the maintenance function is halted while the surge hopper 24 is replenished.

Rack 170, mounted in the opening of the surge hopper 24, reciprocates to distribute the ballast stone delivered by the horizontal conveyor evenly 24 throughout compartments 38a–d. The ballast stone flows by gravity through openings 60a–d into auger inlets 46a–d to provide a constant supply of stone to the metering augers 26a–d. The auger screws 40a–d are rotatably driven by drive motors 58a–d to carry the stone upward from the inlets 46a–d through the metering augers 44a–d along the flights 42a–d of the screws 40a–d. The outlet gates 62a–d are opened as rotation of the auger screws 40a–d begins.

The stone expands along auger screws 40a–d as it is driven upward along the variable pitch flights 42a–d. Upon reaching the upward extreme of the casing 44a–d, the stone is expelled from the metering augers 26a–d through outlets 48a–d. The stone flows by gravity into the splitters 28a–d where it is evenly divided and fed to the two blow tubes. When stone flow is no longer desired, the drive motors 58a–d are stopped and the outlet gates 62a–d are closed to prevent stone from spilling into the splitters. As discussed above, encoder 56 provides the control system (not shown) with an accurate measure of the number of revolutions of the auger screw 40. The amount of stone delivered by the metering augers 26a–d is determined by multiplying the revolutions of the auger screws 40a–d by the average flow rate (i.e. 1.32 kg/revolution).

In addition, fluid pressure build-up in the feed line causes the hydraulic motor 58 to overshoot or continue to rotate for a short period after the motor has been shut off (e.g. the hydraulic valve is shut off). The amount of overshoot is proportional to the speed of the motor prior to shut off. Overshoot adversely affects the accuracy of the system by causing additional stone to fall into the splitter. Accordingly, the control system preferably considers an overshoot parameter which dictates how far in advance the motor 58 must be shut off to compensate for the overshoot.

IV. Alternative Ice-Cube Tray Embodiment

In an alternative embodiment of the present invention, the metering augers 26a–d are replaced by unique belt-like conveyors 110. With the exception of the stone conveying/metering units, the stoneblower and stone metering system are identical to those described in conjunction with the auger embodiment.

Figure 6:
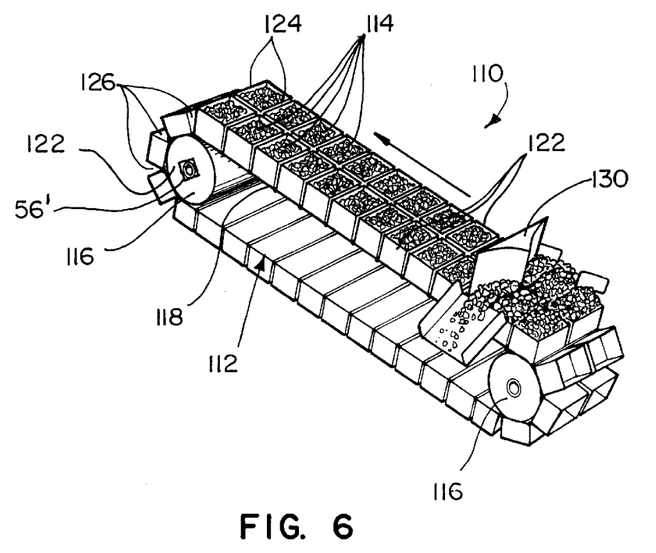
FIG. 6 is a perspective view of a metering conveyor according to an alternative embodiment.
Figure 7:
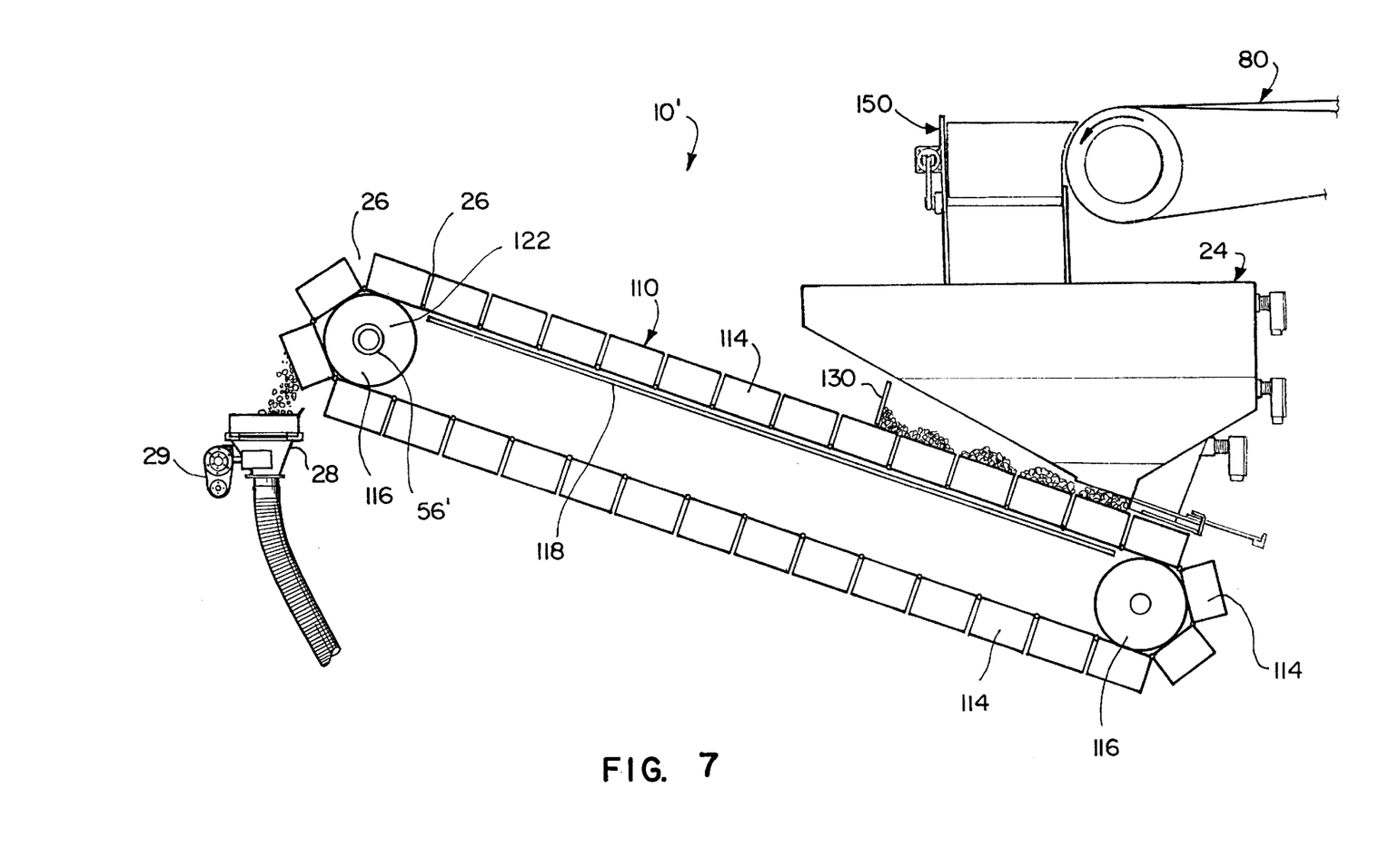
FIG. 7 is a side elevational view of the surge hopper and alternative metering conveyor.

A metering conveyor constructed in accordance with the alternative embodiment is illustrated in FIGS. 6 and 7. The metering conveyor 110 includes a conveyor belt 112, a plurality of support rollers 116, a steel slider bed 118 for supporting the conveyor belt, and a conventional drive system, such as a hydraulic motor (not shown).

The conveyor belt 112 is unique and separated into a number of compartments 114 by a plurality of intersecting longitudinally and laterally extending walls 122 and 124. Each of the compartments 114 are precisely and uniformly sized to hold a specific quantity of stone. Preferably, the belt 112 is approximately 5 inches wide and the individual compartments 114 are approximately 2 inches wide by 2 inches long by 1 inch high. A plurality of cuts 126 are made through the longitudinally extending walls to allow the belt 112 to move around the support rollers 118.

A stone distribution plate 130 is positioned above the conveyor 110 immediately upstream from the location where the surge hopper 24 feeds the conveyor belt 112. The exact longitudinal location of the distribution plate 130 is not critical, and it may alternatively be located adjacent the upper support roller 122 to level the stone immediately prior to dumping.

V. Operation of Alternative Embodiment

The surge hopper 24 feeds stone directly into the compartments 114 of the conveyor belt 112. The conveyor belt 112 in turn conveys the stone upward and expels it into the splitter 28. As the conveyor belt 112 carries stone upward, it passes beneath the distribution plate 130 which levels and distributes the stone carried in the compartments 114 (See FIG. 7) to improve the uniformity of stone within each compartment. As the conveyor belt 112 rounds the upper support roller 122, the stone is dumped from the compartments 114 into the corresponding splitter 28.

As in the preferred embodiment, the amount of stone delivered by the conveyors 110 is determined in part by an encoder 56'. In this embodiment, the encoder 56' monitors the rotational movement of the upper support roller 122 to determine the number of compartments 114 dumped into the splitter 28. The control system (not shown) multiplies the number of compartments 114 dumped into the splitter by the amount of stone carried by each compartment to determine the total amount of stone delivered. Alternatively, a sensor (not shown) may be mounted adjacent the belt 112 to determine the number of compartments 114 passing thereby. Preferably, the sensor is photoelectric. However, a variety of conventional sensors will suffice.

The above descriptions are those of preferred embodiments of the invention. Various alterations and changes can be made without departing from the spirit and broader aspects of the invention set forth in the appended claims, which are to be interpreted in accordance with the principles of patent law, including the Doctrine of Equivalents.

The embodiments of the invention in which an exclusive property or privilege is claimed are defined as follows:

1. An improved track maintenance vehicle having a superstructure adapted to travel along a railroad track having a cant and a grade, at least one workhead carried on said superstructure, a plurality of blow tubes carried on said workhead, a supply of ballast stones carried on said superstructure, the stones having a plurality of characteristics, a means for moving the ballast stones from the supply of ballast stones to the workhead, wherein the improvement comprises said means for moving said ballast stones from said supply of ballast stones to said workhead comprising:

conveying means for metering and conveying stone, said conveying means having an input end in proximity to said supply of ballast stones and an output end;

a splitter for dividing the stones exiting said output end of said conveying means between two of said blow tubes, said splitter including a movable splitter wall having a variable offset with respect to said output end of said conveying means, whereby said splitter wall can be moved to change the proportional division of the stone between said blow tubes; and     a control including an actuator means for selectively controlling the offset of said splitter wall as a function of at least one of the track cant, the track grade, and the stone characteristics, to provide a desired distribution of stones between said two blow tubes.

2. The improved track maintenance vehicle of claim 1, wherein said conveying means includes a conveyor belt having a surface which is divided into a plurality of compartments, said conveying means further including a stone distribution plate mounted vertically adjacent said conveyor belt.

3. The improved track maintenance vehicle of claim 1, wherein said conveying means includes a stone metering auger including a casing having inlet and outlet openings and an auger screw having longitudinally opposite inlet and outlet ends rotatably housed within said casing, said stone metering auger disposed such that said casing inlet opening is aligned with said surge hopper outlet opening, said auger screw including flights that increase in pitch as they extend longitudinally along the screw away from said inlet end, said auger screw further including flights that decrease in diameter at said outlet end.

4. The improved track maintenance vehicle of claim 3, further comprising an outlet gate mounted over said casing outlet opening and a gate control means for actuating said outlet gate between a first open position in which stone may be expelled from said metering auger through said casing outlet opening and a second closed position in which stone is prevented from being expelled from said metering auger through said casing outlet opening.

5. An improved track maintenance vehicle having a superstructure adapted to travel along a railroad track, at least one workhead carried on said superstructure, a plurality of blow tubes carried on said workhead, a main hopper containing ballast stones carried on said superstructure, a means for moving the ballast stones from the main hopper to the workhead, wherein the improvement comprises:

said means for moving said ballast stones from said main hopper to said workheads including a stone metering apparatus supported upon said track maintenance vehicle, said stone metering apparatus comprising:

a surge hopper having an outlet opening, a means for metering and conveying stone having an input end in proximity to said surge hopper outlet opening and an output end, said metering and conveying means including a stone metering auger including a casing having inlet and outlet openings and an auger screw having longitudinally opposite inlet and outlet ends rotatably housed within said casing, said stone metering auger disposed such that said casing inlet opening is aligned with said surge hopper outlet opening, said auger screw including flights that increase in pitch as they extend longitudinally along the screw away from said inlet end, said auger screw further including flights that decrease in diameter at said outlet end,     an outlet gate mounted over said casing outlet opening and a gate control means for actuating said outlet gate between a first open position in which stone may be expelled from said metering auger through said casing outlet opening and a second closed position in which stone is prevented from being expelled from said metering auger through said casing outlet opening,     a splitter for dividing and distributing the stone conveyed by said metering and conveying means to said plurality of blow tubes,     a splitter mounting means for mounting said splitter in proximity to said output end of said metering and conveying means whereby stone expelled from said metering and conveying means passes into said splitter, and     a stone replenishing system mounted on said superstructure for moving stone from said main hopper to said surge hopper, said stone replenishing system including a main auger mounted within said main hopper for moving stone out of said main hopper, a cleat conveyor in proximity to said main hopper for receiving and conveying stone moved out of said main hopper, a stone scalper in proximity to said cleat conveyor for receiving stone conveyed by said cleat conveyor and screening out excessively large stones, a horizontal conveyor having a first end in proximity to said stone scalper and a second end in proximity to said surge hopper for receiving scalped stone from said stone scalper and conveying the scalped stone to said surge hopper, a control means for activating and deactivating said stone replenishing system, and a plurality of stone level sensors mounted within said surge hopper.

6. A railroad track maintenance vehicle for working railroad track in a railroad track bed, the railroad track having a cant and a grade, said maintenance vehicle comprising:

workhead means for delivering stone to the railroad track bed, said workhead means including a pair of stone delivery devices;

storage means for storing a quantity of stone to be delivered to said workhead means, the stone having a plurality of characteristics;

a conveying means for conveying stones from said storage means to said workhead means, said conveying means including an inlet and an outlet for receiving and discharging stone, respectively;

splitter means positioned between said conveying means and said stone delivery devices for dividing stone exiting said conveying means outlet between said pair of stone delivery devices, said splitter means including a splitter wall having a horizontal offset with respect to said conveying means outlet, whereby said splitter wall can be moved to change the proportional division of the stone between said stone delivery devices; and a control including an actuator means for selectively controlling the offset of said splitter wall as a function of at least one of the track cant, the track grade, and the stone characteristics, thereby providing a desired distribution of stones between said pair of stone delivery devices.

7. A railroad track maintenance vehicle as defined in claim 6, wherein each of said stone delivery devices comprises a tube.

8. A railroad track maintenance vehicle as defined in claim 7, wherein said vehicle comprises a stoneblower.

* * * * *